United States Patent
Lee

(10) Patent No.: US 8,094,445 B2
(45) Date of Patent: Jan. 10, 2012

(54) ELECTRONIC DEVICE WITH PROTECTION FOR DISK DRIVE

(75) Inventor: Mario John Dominic Lee, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 295 days.

(21) Appl. No.: 12/456,067

(22) Filed: Jun. 11, 2009

(65) Prior Publication Data

US 2010/0259849 A1    Oct. 14, 2010

(30) Foreign Application Priority Data

Apr. 8, 2009    (CN) .......................... 2009 2 0301974

(51) Int. Cl.
   *G06F 1/16*    (2006.01)

(52) U.S. Cl. ................ 361/679.33; 360/324.1; 345/467; 720/619

(58) Field of Classification Search .................. 720/692, 720/647, 600, 619; 361/679.26, 679.3, 679.31, 361/679.32, 679.57, 679.02, 679.58, 679.43, 361/679.41, 679.33, 679.06, 679.39, 679.29; 345/168, 440, 240, 2.2, 467, 55, 419; 360/97.02, 360/99.01, 245.9, 324.1, 39, 98.01, 92.1; 312/209, 223.6, 223.2; 439/296, 638, 79; 165/104.26, 104.33

See application file for complete search history.

(56) References Cited

U.S. PATENT DOCUMENTS

| | | | | |
|---|---|---|---|---|
| 5,227,957 A | * | 7/1993 | Deters ...................... | 361/679.32 |
| 2004/0168180 A1 | * | 8/2004 | Wei ................................ | 720/692 |
| 2006/0023416 A1 | * | 2/2006 | Chen ............................. | 361/685 |

* cited by examiner

*Primary Examiner* — Hung Duong
(74) *Attorney, Agent, or Firm* — Altis Law Group, Inc.

(57) ABSTRACT

An electronic device includes a tray, a disk drive secured in the tray, a first back plane secured on the tray, and a flexible connecting member. The disk drive connects with the first back plane by the connecting member so that the disk drive is spaced from the first back plane when the disk drive is vibrated.

14 Claims, 3 Drawing Sheets

ELECTRONIC DEVICE WITH PROTECTION FOR DISK DRIVE

BACKGROUND

1. Technical Field

The present disclosure relates to electronic devices with disk drives, and particularly to an electronic device capable of protecting the disk drive from vibrations.

2. Description of Related Art

In a hot-plug electronic device such as a computer or a server, a back plane with a connector is often provided. A connector is disposed on the disk drive. In assembly, the connector of the disk drive directly electrically engages with the connector of the back plane to form a rigid connection between the disk drive and the back plane when the disk drive is inserted in a bracket of the electronic device. However, because the disk drive can generate vibrations when operating, a rigid connection between the disk drive and the back plane is not helpful to protect the disk drive from the vibrations.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
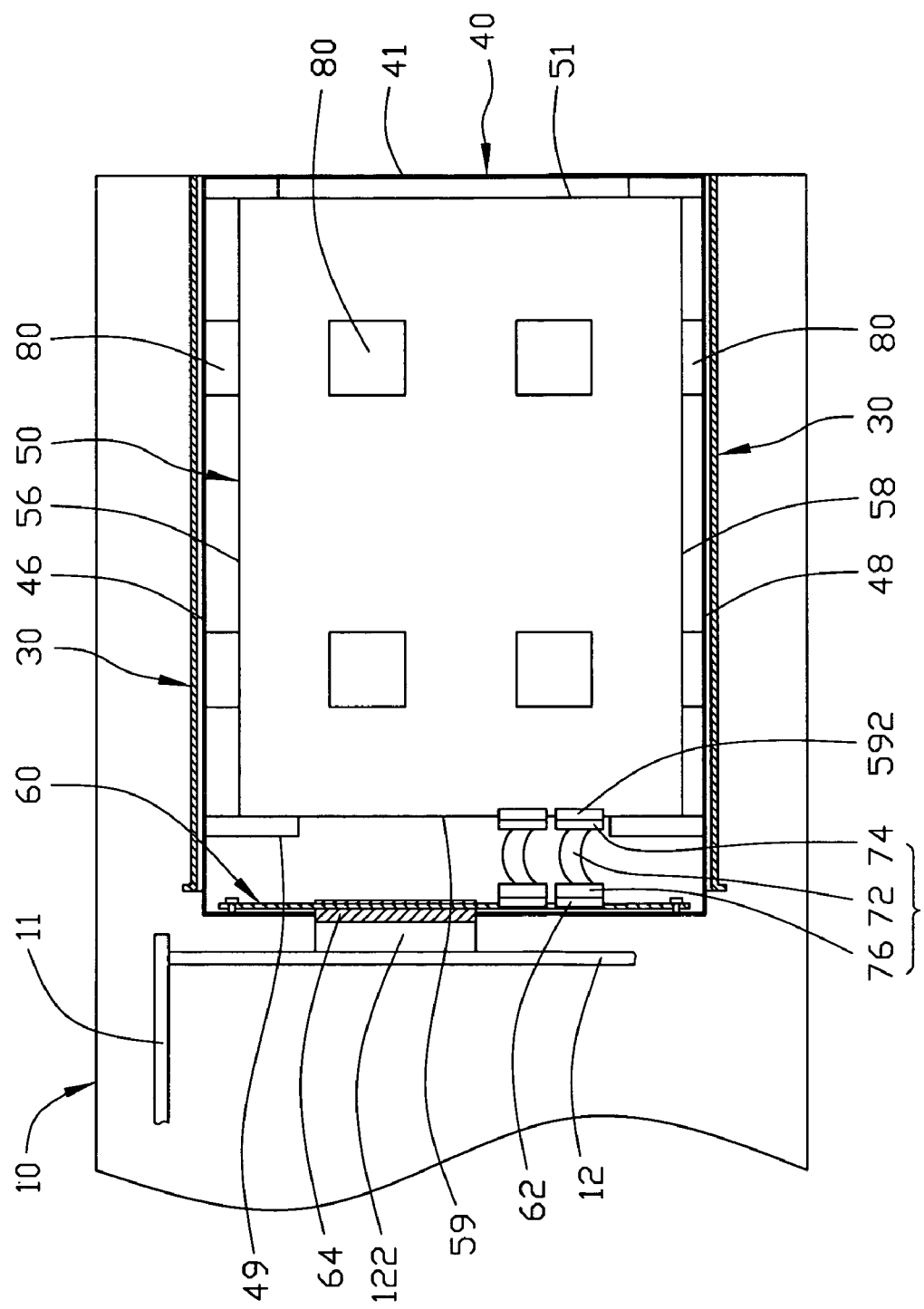
FIG. 1 is a top, cutaway view of an embodiment of an electronic device.
Figure 2:
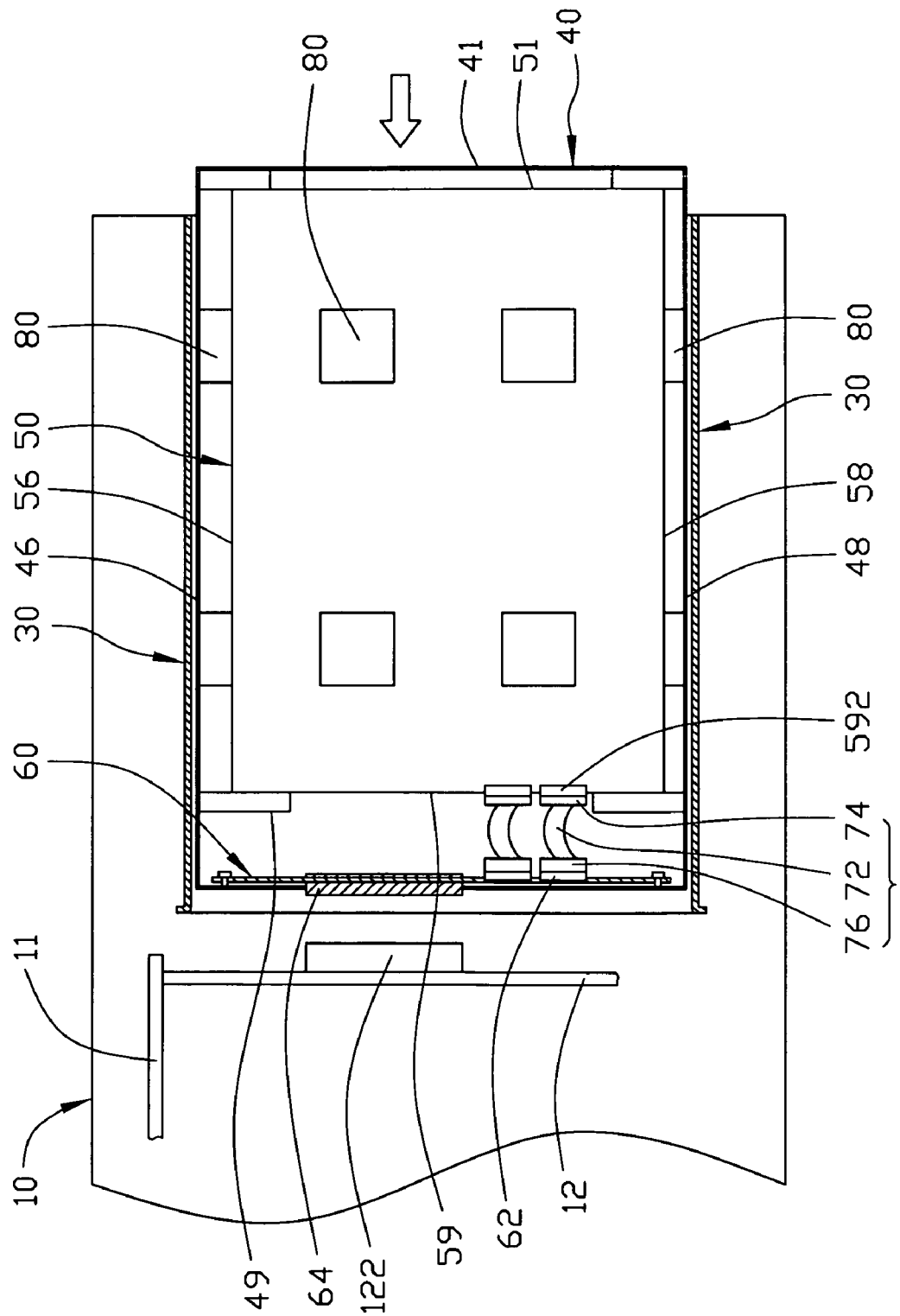
FIG. 2 is similar to FIG. 1, but showing a first back plane disengaged from a second back plane.
Figure 3:
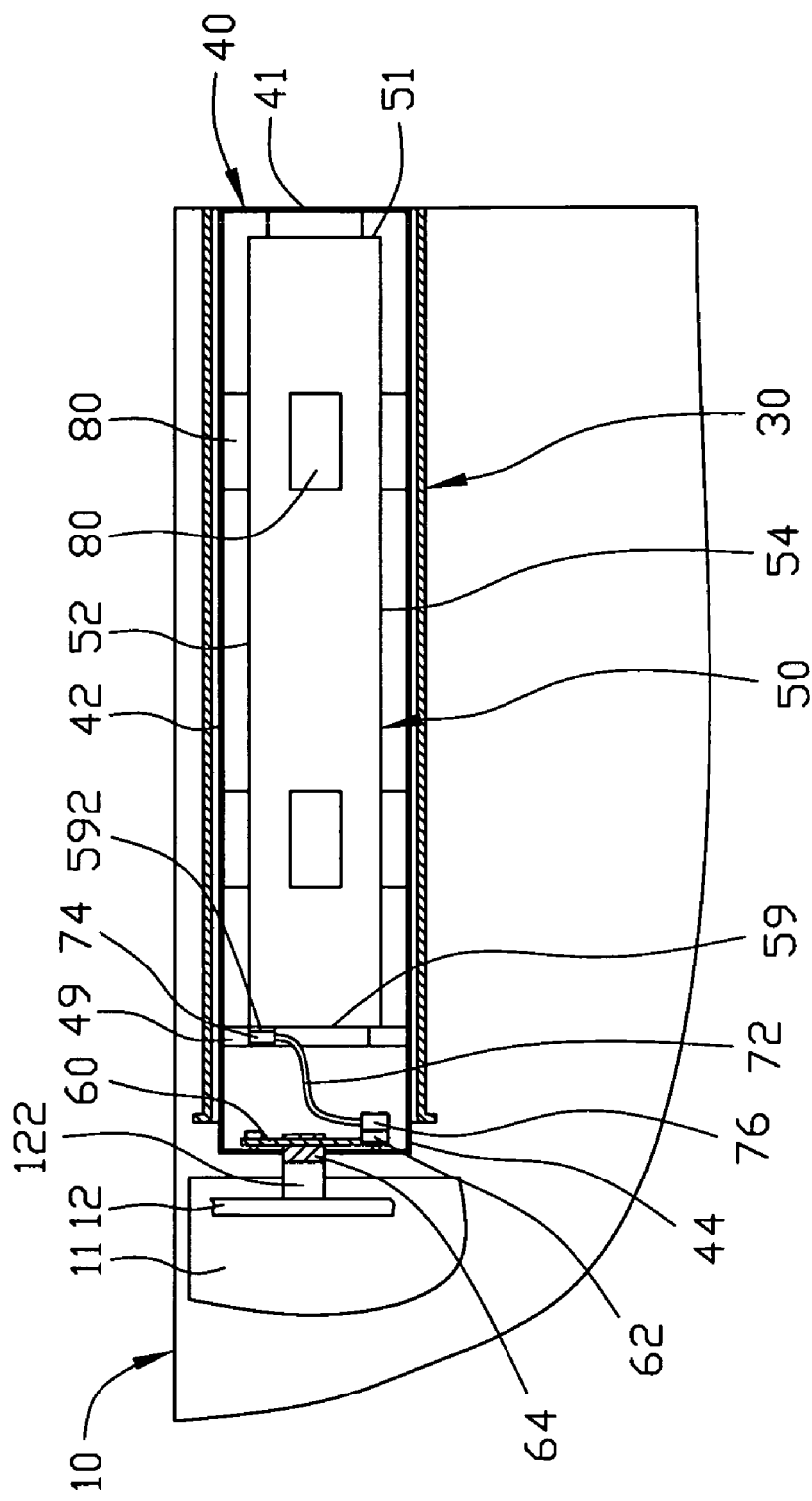
FIG. 3 is a side, cutaway view of the electronic device of FIG. 1.

Referring to FIGS. 1-3, an embodiment of an electronic device such as a computer or a server includes a chassis 10, a bracket 30, a tray 40 for receiving a disk drive 50, a first back plane 60, and a flexible connecting member 70.

The chassis 10 is configured to secure a motherboard 11 therein. A second back plane 12 is perpendicularly secured on and electrically connected to the motherboard 11. The second back plane 12 is a circuit board. A connector 122 is disposed on the second back plane 12.

The bracket 30 is mounted in the chassis 10, and positioned on one side of the second back plane 12.

The tray 40 is configured to be received in the bracket 30, and includes a front plate 41, a top plate 42, a bottom plate 44 parallel to the top plate 42, two parallel side plates 46, 48, and a rear plate 49 parallel to the front plate 41. The top plate 42, the bottom plate 44, the side plates 46, 48 are generally perpendicular to the front plate 41, and the top plate 42 is perpendicular to the side plates 46, 48.

The disk drive 50 includes a front wall 51, a top wall 52, a bottom wall 54 parallel to the top wall 52, two parallel sidewalls 56, 58, and a rear wall 59 parallel to the front wall 51. The top wall 52, the bottom wall 54, the sidewalls 56, 58 are generally perpendicular to the front wall 51, and the top wall 52 is generally perpendicular to the sidewalls 56, 58. A connector 592 is secured on the rear wall 59.

The first back plane 60 is a circuit board, and configured to mount on the tray 40 on a rear side thereof. Two first and second connectors 62, 64 are disposed on opposite surfaces of the first back plane 60. The second connector 64 is configured to engage with the second back plane connector 122.

The connecting member 70 includes a flexible cable 72 and two first and second connector 74, 76 fixed on two ends of the cable 72. The first connector 74 is configured to engage with the connector 592 of the disk drive 50, and the second connector 76 is configured to engage with the first connector 62 of the first back plane 60.

In assembly, the disk drive 50 is secured in the tray 40. The front wall 51, the top wall 52, the bottom wall 54, the sidewalls 56, 58, and the rear wall 59 of the disk drive 50 respectively face the front plate 41, the top plate 42, the bottom plate 44, the side plates 46, 48, and the rear plate 49 of the tray 40. A plurality of vibration absorbers 80 is located between the disk drive 50 and the tray 40 on multiple sides. The first back plane 60 is fixed on the rear side of the tray 40 with fasteners such as screws. The first connector 74 of the connecting member 70 engages with the connector 592 of the disk drive 50, and the second connector 76 engages with the first connector 62 of the first back plane 60. Therefore, the first back plane 60 is flexibly connected to the disk drive 50 with the connecting member 70.

The disk drive 50, the tray 40, and the first back plane 60 are together inserted into the bracket 30 along a direction (designated by arrowhead in FIG. 2), until the second connector 64 of the first back plane 60 engages with the second back plane connector 122. The direction can be perpendicular to the second back plane 12, and parallel to the motherboard 11. Therefore, the disk drive 50 is secured in the bracket 30 of the chassis 10.

In use, when the electronic device is operating, the motherboard 11, the second back plane 12, the first back plane 60, and the disk drive 50 can receive and transmit electrical signals between each other via the connectors 122, 64, 62, 592 and the connecting member 70. If the disk drive 50 generates vibrations, they can be absorbed by the vibration absorbers 80. Furthermore, because the first back plane 60 is flexibly connected to the disk drive 50 with the connecting member 70, vibrations of the disk drive 50 cannot transfer to the first back plane 60. Therefore, the disk drive 50 can be protected from collisions with the first connector 62 of the first back plane 60 and the connector 592 of the disk drive 50.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a tray, a disk drive secured in the tray, a first back plane secured on the tray, and a flexible connecting member, wherein the disk drive connects with the first back plane by the connecting member so that the disk drive is spaced from the first back plane.

2. The electronic device of claim 1, wherein a disk drive connector is disposed on the disk drive; a first back plane connector is disposed on the first back plane; the connecting member comprises a first connecting member connector configured to electrically engage with the disk drive connector, a second connecting member connector configured to electrically engage with the first back plane connector, and a flexible cable electrically connected between the first and second connecting member connectors.

3. The electronic device of claim 1, further comprising a chassis that receives the tray and a second back plane disposed on one side of the tray.

4. The electronic device of claim 3, wherein the second back plane is parallel to the first back plane and electrically connected to the first back plane.

5. The electronic device of claim 4, wherein the tray is capable of being removed from the chassis along a direction that is perpendicular to the second back plane.

6. The electronic device of claim 5, further comprising a bracket that is capable of receiving the tray along the direction.

7. The electronic device of claim 4, wherein a motherboard is secured to chassis, and electrically connected with the second back plane; the motherboard is generally perpendicular to the first and second back planes.

8. The electronic device of claim 1, wherein a plurality of vibration absorbers is disposed between the disk drive and tray and is capable of absorbing vibration of the disk drive.

9. An electronic device comprising:
  a tray capable of receiving a disk drive therein;
  a first back plane secured on the tray and electrically connect to the disk drive with a flexible connection so that any vibration of the disk drive is prevented from transferring to the first back plane; and
  a chassis comprising of a second back plane therein, the second back plane electrically connecting with the first back plane.

10. The electronic device of claim 9, wherein a disk drive connector is disposed on the disk drive; a first back plane connector is disposed on the first back plane; the flexible connection comprises a first connector electrically engaging with the disk drive connector, a second connector electrically engaging with the connector of the first back plane, and a flexible cable electrically connected between the first and second flexible connection connectors.

11. The electronic device of claim 9, wherein the tray is capable of inserting in the chassis along a direction that is perpendicular to the second back plane.

12. The electronic device of claim 11, further comprising a bracket capable of receiving the tray along the direction.

13. The electronic device of claim 9, wherein a motherboard is secured to chassis, and electrically connected with the second back plane; the motherboard is generally perpendicular to the first and second back planes.

14. The electronic device of claim 9, wherein a plurality of vibration absorbers is disposed between the disk drive and tray, and capable of absorbing vibration of the disk drive.

* * * * *